United States Patent
Bode et al.

(10) Patent No.: US 10,750,886 B2
(45) Date of Patent: Aug. 25, 2020

(54) SYSTEMS AND METHODS OF OBJECTIVELY CONFIRMING CUSTOMER SELF-SCANNING OF PRODUCTS IN A RETAIL STORE

(71) Applicant: Walmart Apollo, LLC, Bentonville, AR (US)

(72) Inventors: Brian D. Bode, Bentonville, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/167,245

(22) Filed: Oct. 22, 2018

(65) Prior Publication Data
US 2019/0125106 A1    May 2, 2019

Related U.S. Application Data

(60) Provisional application No. 62/577,893, filed on Oct. 27, 2017.

(51) Int. Cl.
*G06K 7/00*    (2006.01)
*A47F 9/04*    (2006.01)
(Continued)

(52) U.S. Cl.
CPC .......... *A47F 9/048* (2013.01); *G06K 7/10445* (2013.01); *G06K 7/10475* (2013.01);
(Continued)

(58) Field of Classification Search
USPC ....... 235/375–385, 435, 439, 454, 487, 492; 705/5, 35–45
See application file for complete search history.

(56) References Cited

U.S. PATENT DOCUMENTS

| 6,018,397 A | 1/2000 | Cloutier |
| 6,104,285 A | 8/2000 | Stobbe |

(Continued)

OTHER PUBLICATIONS

PCT; App. No. PCT/US2018/057019; International Search Report and Written Opinion dated Jan. 16, 2019.
(Continued)

*Primary Examiner* — Matthew Mikels
(74) *Attorney, Agent, or Firm* — Fitch, Even, Tabin & Flannery LLP

(57) ABSTRACT

In some embodiments, systems and methods are provided to confirm customer scanning of products. Some embodiments provide retail store automated product confirmation systems, comprising: a plurality of RFID tag readers; a scan compiling circuit communicatively coupled with a plurality of portable product scanning systems and configured to associate the scanned identifying information with the customer and create a purchase list; and a scan confirmation circuit configured to: receive product identifying information detected by two RFID tag readers and associated with the customer without the customer having to travel through a choke point, generate an RFID detected product listing, determine a current level of accuracy between the RFID detected product listing and the purchase list, and direct an action be taken based on the determined level of accuracy.

17 Claims, 3 Drawing Sheets

(51) Int. Cl.
*G06Q 20/20* (2012.01)
*G07G 1/00* (2006.01)
*G07G 3/00* (2006.01)
*G06K 7/10* (2006.01)
*G06K 9/00* (2006.01)

(52) U.S. Cl.
CPC ......... *G06K 9/00671* (2013.01); *G06Q 20/20* (2013.01); *G06Q 20/208* (2013.01); *G07G 1/0054* (2013.01); *G07G 1/0081* (2013.01); *G07G 3/003* (2013.01)

(56) References Cited

U.S. PATENT DOCUMENTS

| | | |
|---|---|---|
| 6,601,759 B2 | 8/2003 | Fife |
| 6,606,411 B1 | 8/2003 | Loui |
| 6,745,186 B1 | 6/2004 | Testa |
| 6,810,149 B1 | 10/2004 | Squilla |
| 6,886,101 B2 | 4/2005 | Glazer |
| 6,937,989 B2 | 8/2005 | McIntyre |
| 7,177,820 B2 | 2/2007 | McIntyre |
| 7,195,157 B2 | 3/2007 | Swartz |
| 7,222,363 B2 | 5/2007 | Rice |
| 7,431,208 B2 | 10/2008 | Feldman |
| 7,587,756 B2 | 9/2009 | Peart |
| 7,716,064 B2 | 5/2010 | McIntyre |
| 7,780,081 B1 | 8/2010 | Liang |
| 8,069,092 B2 | 11/2011 | Bryant |
| 8,572,712 B2 | 10/2013 | Rice |
| 8,814,039 B2 | 8/2014 | Bishop |
| 8,820,633 B2 | 9/2014 | Bishop |
| 8,851,369 B2 | 10/2014 | Bishop |
| 2004/0220860 A1 | 11/2004 | Persky |
| 2012/0166241 A1* | 6/2012 | Livingston ......... G06Q 10/0631 705/7.12 |
| 2012/0321146 A1 | 12/2012 | Kundu |
| 2014/0214609 A1 | 7/2014 | Pedley |
| 2014/0279294 A1 | 9/2014 | Field-Darragh |
| 2015/0060543 A1* | 3/2015 | Bellows ................. G06Q 30/06 235/385 |
| 2015/0095189 A1* | 4/2015 | Dharssi ................ G07G 1/0063 705/26.8 |
| 2015/0112826 A1 | 4/2015 | Crutchfield |

OTHER PUBLICATIONS

Kok, Francis; "Supermarket Automatic Check-Out System (SACOS)"; Tech Briefs Create the Future Design Contest 2017; https://contest.techbriefs.com/2013/entries/consumer-products/3132; Mar. 31, 2013; pp. 1-4.
Retail Customer Experience.com; "3 ways to stop theft at the self-checkout"; https://www.retailcustomerexperience.com/articles/3-ways-to-stop-theft-at-the-self-checkout/; Apr. 12, 2012; pp. 1-2.
Woodford, Chris; "Radio frequency (RF and RFID) tags"; http://www.explainthatstuff.com/rfid.html; May 21, 2017; pp. 1-10.

* cited by examiner

SYSTEMS AND METHODS OF OBJECTIVELY CONFIRMING CUSTOMER SELF-SCANNING OF PRODUCTS IN A RETAIL STORE

CROSS-REFERENCE TO RELATED APPLICATION

This application claims the benefit of U.S. Provisional Application No. 62/577,893, filed Oct. 27, 2017, which is incorporated herein by reference in its entirety.

TECHNICAL FIELD

This invention relates generally to retail stores confirming customer self-scanning.

BACKGROUND

Retail stores continue to be a primary way in which people purchase products for consumption and use. Customers enter the store and move through the store looking for products to purchase. The products are distributed throughout a sales floor of the retail store and accessible for customers to retrieve. There continues to be a need to provide an improved and positive shopping experience for customers.

BRIEF DESCRIPTION OF THE DRAWINGS

Disclosed herein are embodiments of systems, apparatuses and methods pertaining to retail stores confirming customer self-scanning. This description includes drawings, wherein.

Figure 1:
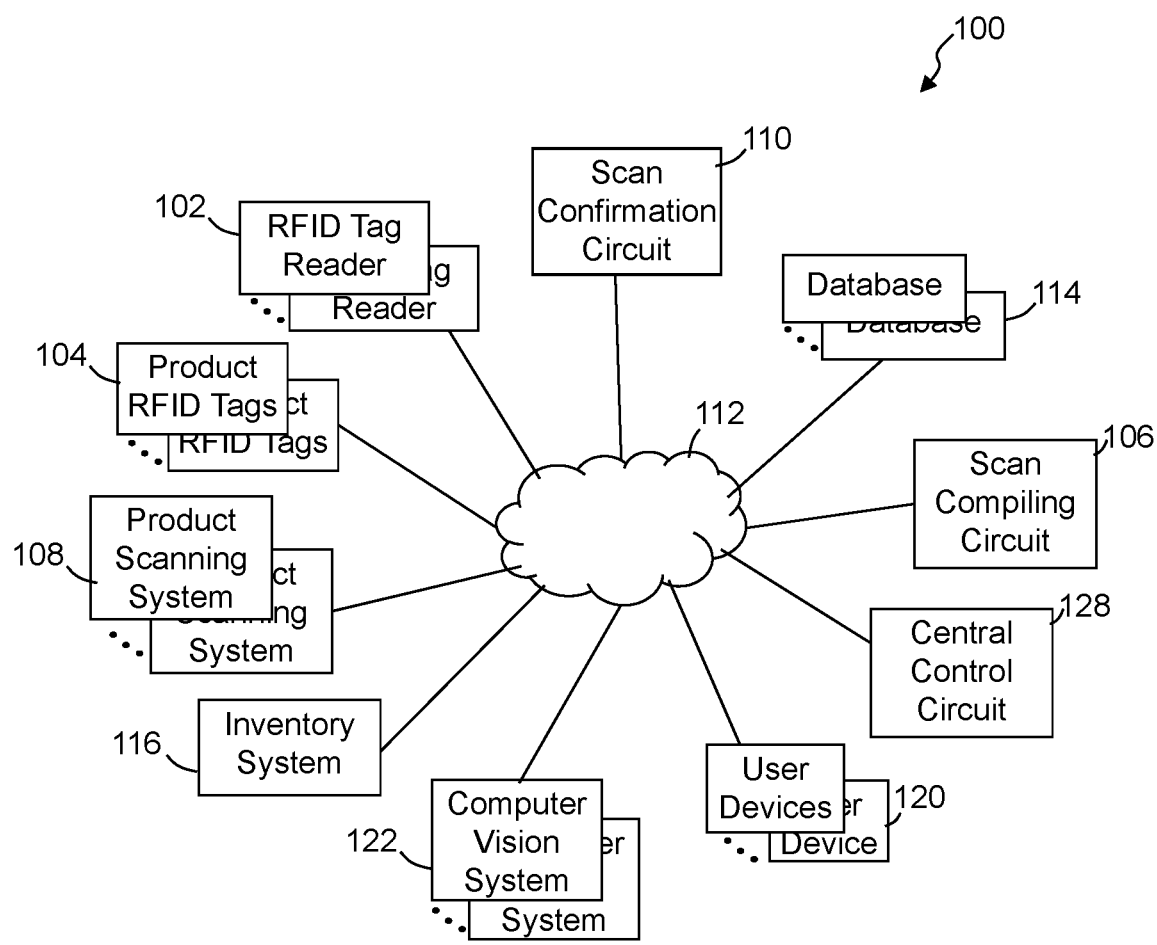
FIG. 1 illustrates a simplified block diagram of an exemplary retail store automated product confirmation system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, circuits, systems, apparatuses, processes and methods are provided to confirm customer scanned products as the customer continues to move through the retail store and shop for products. Some embodiments provide a retail store automated product confirmation system that includes a plurality of RFID tag readers arranged in a grid over a sales floor of a retail store; a scan compiling circuit operating independent of the plurality of RFID tag readers and communicatively coupled with a plurality of portable product scanning systems each configured to enable a customer to scan identifying information of products at a retail store that the customer intends to purchase as the customer travels along the sales floor of the retail store, wherein the scan compiling circuit is configured to associate the scanned identifying information with the customer and create a purchase list of the products scanned by the customer; and a scan confirmation circuit communicatively coupled with the plurality of RFID tag readers and the scan compiling circuit, wherein the scan confirmation circuit is configured to: receive product identifying information of products detected by at least two different RFID tag readers of the plurality of RFID tag readers, and wherein the received product identifying information and the corresponding products are to be associated with the customer as the customer travels along the sales floor without the customer having to travel through a choke point in the retail store, generate an RFID detected product listing of the products detected by the at least two different RFID tag readers and that are associated with the customer, determine a current level of accuracy based on the consistency between the RFID detected product listing and the purchase list, and direct that at least a first action be taken based on the determined level of accuracy determination of whether the RFID detected product listing is consistent.

Previous systems that attempted to detect products from a cart force customers to push the cart through a choke point. Such choke points are typically relatively narrow channels through which a single cart can fit, with multiple sensors positioned along that narrow channel. Such systems, however, are often inaccurate due in part to interference with RFID tags from other products also in the cart, and fail to provide confirmation over time. Further, such systems do not cross-check with other lists of products.

Figure 2:
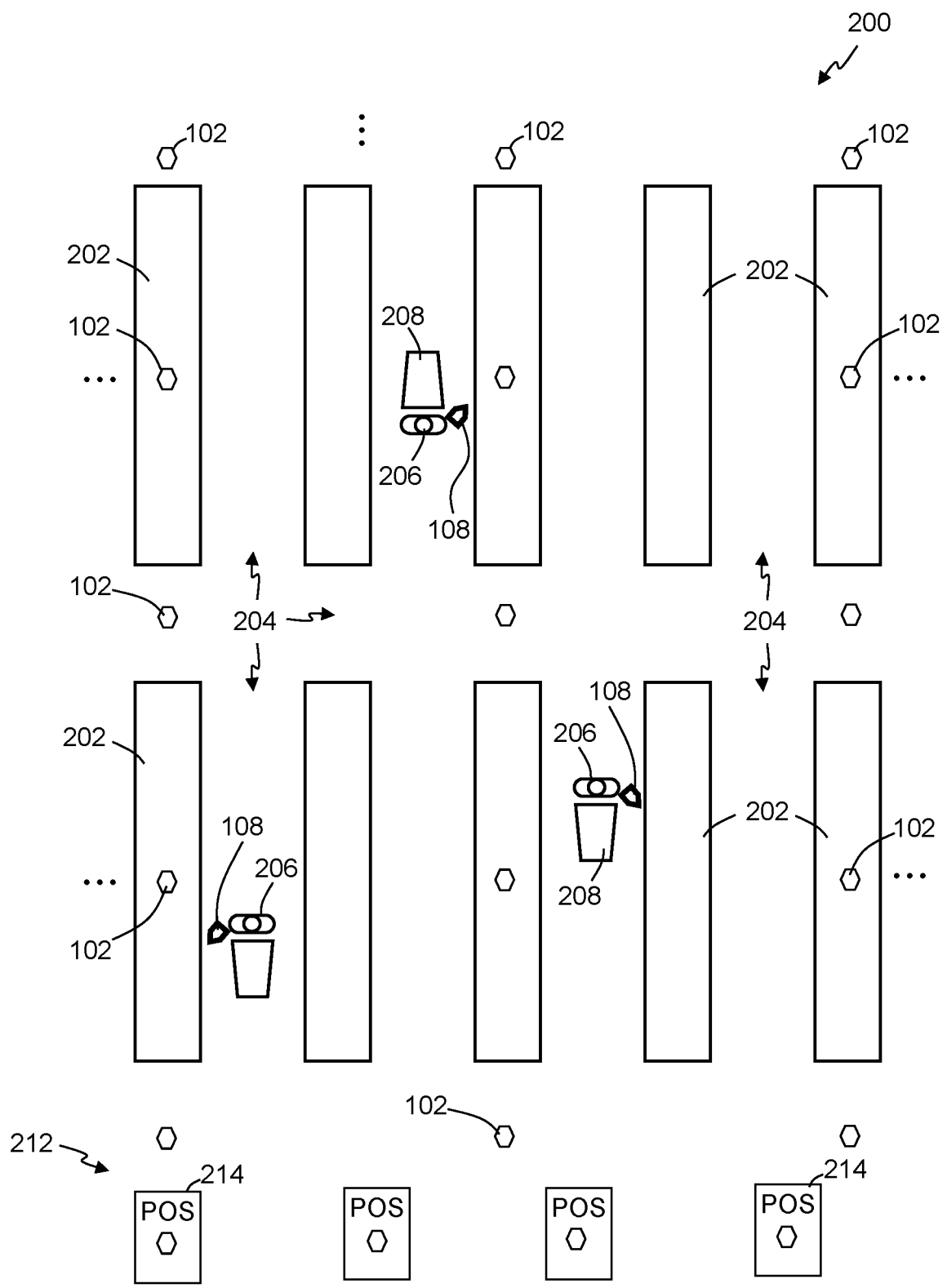
FIG. 2 illustrates a simplified overhead view of a portion of a sales floor of an exemplary retail store, in accordance with some embodiments.

FIG. 1 illustrates a simplified block diagram of an exemplary retail store automated product confirmation system 100 that evaluates the accuracy of customers as customers scan products they intend to purchase, in accordance with some embodiments. FIG. 2 illustrates a simplified overhead view of a portion of a sales floor 200 of an exemplary retail store, in accordance with some embodiments. Referring to FIGS. 1-2, the product confirmation system 100 includes a plurality of radio frequency identifier (RFID) tag readers 102 each configured to detect multiple different product RFID tags 104 each corresponding to different products that are distributed throughout the retail store. In some implementations the RFID tag readers 102 are arranged in a grid over the sales floor 200 of the retail store. Further, the product confirmation system 100 includes a scan compiling circuit 106 operating independent of the plurality of RFID tag readers 102 and communicatively coupled with a plurality of portable product scanning systems 108, and a scan confirmation circuit 110 that is communicatively coupled over one or more wired and/or wireless communication and/or computer networks 112 with at least the plurality of RFID tag readers 102 and the scan compiling circuit 106.

The portable product scanning systems 108 are each configured to enable a customer to scan identifying information of products at a retail store that the customer intends to purchase as the customer travels through the sales floor of the retail store. In some instances, the customer checks out a product scanning system 108 from a worker at the retail store, a kiosk, vending system, or other such dispensing system at the retail store. The checking out of the product scanning system associates a specific product scanning system (e.g., based on a unique identifier, which may be communicated by the product scanning system to the scan compiling circuit 106, a central control circuit 128, the scan confirmation circuit 110, or other system associated with the retail store) to the particular customer. For example, the customer can provide one or more unique identifying information (e.g., a customer identifier number (e.g., encoded in a magnetic strip of a customer card, memorized by the customer, etc.), a customer associated RFID tag (e.g., embedded in a customer card), a driver's license number, a phone number, receive a communication from a portable user device 120 associated with the customer, or other such identifier or combination of identifiers), which can be used to identify the customer and/or confirm an identification of the customer. The particular product scanning system 108 can temporarily be associated with that customer, and typically exclusively associated with that customer for a limited period of time. The product scanning system 108 can, for example, be a portable, handheld bar code scanner and/or RFID tag reader that the customer carries and uses to scan product identifying information of products the customer intends to purchase. Similarly, one or more product scanning systems 108 may be secured with a shopping cart 208, basket or other device used by customers to transport products retrieved and intended to be purchased by the customer. Further, a holder may be secured with a shopping cart 208, basket, etc. that can receive a handheld product scanning system freeing up the customer's hands. Additionally or alternatively, a product scanning system 108 may be implemented through a customer's personal, portable user device 120 (e.g., smart phone, laptop, smart wearable device (e.g., watch, glasses, etc.), and/or other such devices). An application (APP) implemented on the device may, for example, utilize a camera to capture an image of identifying information (e.g., bar code, name, etc.). For example, the APP may be the Scan & Go™ App from Wal-Mart Stores, Inc. and Sam's Club™. The user device 120 is associated with the customer through the customer profile or otherwise associated with the customer.

As introduced above, the product confirmation system 100 includes one or more scan compiling circuits 106 that is communicatively coupled with the product scanning systems 108. In some embodiments, the scan compiling circuit 106 is in wireless communication (e.g., via Wi-Fi, Bluetooth, cellular, other such wireless communication, or combination of such wireless communication) with the product scanning systems 108. In some embodiments, the product scanning systems wirelessly communicate the scanned product identifying information and/or product identifying information corresponding to the scanned identifying information to the scan compiling circuit 106 along with a product scanning system identifier and/or an identification of the customer with which the product scanning system is currently associated. The scan compiling circuit can identify the relevant customer with which the received identifying product information received from a product scanning system is to be associated, and associates the scanned identifying information with that customer creating a purchase list of the one or more products scanned by the customer. In some instances, the scan compiling circuit accesses the product database to obtain additional or alternative product identifying information, pricing, and/or other such information. The scan compiling circuit and/or a central control circuit 128 may further cross-reference the compiled purchase list with one or more customer shopping lists associated with that customer and/or a customer that is associated with that customer (e.g., a spouse, child, place of business, etc.). Accordingly, as the customer moves through the sales floor 200 retrieving and scanning products intended to be purchased, the scan compiling circuit 106 receives the scanned product identifying information from the product scanning system associated with a particular customer and generates the purchase list of products that the customer has scanned indicating the customer's intent to purchase that product. In some instances, the product scanning system further provides an option that allows a customer to remove a product from the purchase list.

In some embodiments, the scan confirmation circuit 110 similarly receives product identifying information of products detected by at least two different RFID tag readers 102 of the plurality of RFID tag readers. Again, the RFID tag readers 102 are distributed throughout the sales floor 200. As customers move through the sales floor transporting products the corresponding product RFID tags 104 of those products being transported are detected by different RFID tag readers. Often, the RFID tag readers 102 are arranged in a defined pattern to provide read areas over the travel areas 204 of the retail store. The retail store or shopping facility includes multiple product support devices 202, such as but not limited to modular shelves, fixed shelving units, display racks, bins, carts, and/or other such product support devices to support products that are positioned through at least the sales floor and upon which products are mounted or supported for display and retrieval by customers moving through the retail store. The product support devices 202 are positioned throughout the retail store. The placement of the product support devices 202 establishes travel areas 204 (e.g., aisles, walkways, etc.) along which people 206 (e.g., customers, workers, etc.) and other objects can move through the retail store, with at least some of the travel areas 204 being large enough to allow shopping carts 208, pallet jacks, baskets, and/or other movable objects to be moved through the retail store.

The RFID tag readers 102 can be positioned, in some instances, in a grid pattern that provides RFID read coverage over the majority of travel areas, and in some instances all of the travel areas. Accordingly, the RFID tag readers are configured to repeatedly read product RFID tags of products that customers are moving through the travel areas of the retail store. The received product identifying information and the corresponding products are associated with the customer as the customer travels along the sales floor without the customer having to travel through a limited choke point in the retail store. Instead, the pattern of RFID tag readers allows accurate detection of product RFID tags as the customer moves through the store without requiring a limited area where detecting products is performed. The reading of product RFID tags at different locations in the retail store confirms the movement of the products from their previous placement on a product support device 202. Further, in some embodiments, the scan confirmation circuit 110, a central control circuit 128, the product scanning systems, the scan compiling circuit 106, user devices 120, other systems, or a combination of such systems can be utilized to track the movement of different customers as they move through the retail store. In some embodiments, multiple sensor systems (e.g., RFID tag readers 102, computer vision systems 122, distance measurement systems, customer user devices 120, product scanning system 108, bar code readers, etc.) are positioned at multiple different locations in the shopping facility to detect customers, detect customer movement, detect lack of movement, track movement and/or other such sensor systems. In some instances, for example, one or more laser sensor systems may be positioned proximate the ends of one or more travel areas to detect customers and/or carts while in the travel area and/or detect a relative distance to the customer and/or cart, which can be used to determine a customer's location along the travel area. One or more laser sensor systems may, in some applications, be positioned along product support devices to similarly detect the location of customers along the travel areas. Some embodiments utilize one or more image and/or video cameras of the computer vision systems that can capture images and/or video that are processed by one or more image and/or video processing systems of the computer vision system that can be used to identify customers, determine relative locations along the travel areas, identify lack of movement, and the like. Such sensor information can be used to determine customers' location and movement along the travel areas 204. Additionally or alternatively, RFID tag readers 102 may detect one or more RFID tags associated with the customer (e.g., a customer card, etc.), corresponding to a shopping cart 208 associated with the customer, corresponding to a product scanning system 108 associated with the customer, or the like. The RFID tag detection over time can be used to track the customer.

The detected movement of the product RFID tags and the corresponding movement of the customer and/or a cart associated with the customer allows the scan confirmation circuit to associate the products (and/or product identifying information) corresponding to the read product RFID tags with a particular customer in the retail store as the customer travels along the sales floor without the customer having to travel through a choke point in the retail store. Further, in some embodiments, the scan confirmation circuit is configured to generate an RFID detected product listing of the products that are detected by the multiple different RFID tag readers and that are associated with the customer.

In some embodiments, the scan confirmation circuit 110 accesses and/or receives the purchase list associated with a particular customer generated by the scan compiling circuit. In some instances, the scan purchase list is maintained in one or more databases 114. In other implementations, the scan compiling circuit maintains the purchase list in memory of the scan compiling circuit and/or external memory. Accordingly, the purchase list may be communicated to the scan confirmation circuit 110 from the scan compiling circuit, accessed from the database, or otherwise accessed from memory external to the scan compiling circuit. Utilizing the purchase list and the RFID detected product listing, the scan confirmation circuit 110 objectively compares the purchase list and the RFID detected product listing and determines a current objective level of accuracy of scanned products by the customer based on the objective consistency between the RFID detected product listing and the purchase list.

In some embodiments, the scan confirmation circuit in determining the current level of accuracy between the scanned purchase list and the RFID detected product listing is configured to repeatedly determine the current level of accuracy and/or consistency while the customer is in the retail store and continues to travel through at a portion of the sales floor. For example, in some instances, the listings can be evaluated based on a predefined period of time, evaluated based on a schedule, evaluated in response to each product scanned by a product scanning system, evaluated based on a detection at a second RFID tag reader of a product that had not previously been detected by the second RFID tag reader, but was previously detected at a first different RFID tag reader, other such instances, or based on one or more of such conditions. In some implementations, scan confirmation circuit in determining a level of accuracy limits products added to the RFID detected product listing to those products confirmed to have been detected by at least two different RFID tag readers at different locations of the sales floor and each RFID read corresponding to the customer's location at the time of the detection by the multiple RFID tag readers. Still further, the RFID tag reads may be further restricted to RFID tag reads by different RFID tag readers at times separated by at least a threshold duration of time. The scan confirmation circuit, in some applications, confirms that the movement over the sales floor of each of the products of the RFID detected product listing corresponds to a movement of the customer over the sales floor. Some embodiments additionally or alternatively confirm that the movement over the sales floor of each of the products of the RFID detected product listing corresponds to a movement of the product scanning system 108 associated with the customer of interest.

Further, the scan confirmation circuit utilizes the determined level of accuracy in determining whether one or more actions are to be taken and/or what actions are to be taken. As such, based on the determined level of accuracy determination of whether the RFID detected product listing is consistent and/or within a threshold with the purchase list, the scan confirmation circuit may direct that one or more actions are to be taken. In some embodiments, the scan confirmation circuit may identify when a current level of accuracy is at least a threshold level of accuracy, and cause a notification to be communicated to the customer authorizing the customer to exit the retail store without having to pass through a check-out area 212 where products are subsequently scanned for purchase through point of sale systems 214. In other instances, for example, the scan confirmation circuit is configured to identify, while the customer continues to travel over the sales floor, when a particular product that is identified in the RFID detected product listing is not included in the purchase list, and cause a notification to be communicated to the customer, while the customer continues to travel over the sales floor and before moving into the check-out area, notifying the customer of the inconsistency and requesting that the customer scan that product. In some instances, the scan confirmation circuit in directing an action be taken triggers one or more computer vision systems 122 to capture and evaluate images of the products being moved by the customer as the customer continues to move along the sales floor, and to confirm a discrepancy between the RFID detected product listing and the purchase list. For example, image data can be used to confirm the presence or absence of one or more products in a shopping cart and/or confirm the same customer continues to be associated with a particular cart.

In some embodiments, one or more sets of rules and/or parameters are maintained that dictate the actions to be implemented. An actions database may be maintained and/or cross-referenced based on one or more parameters in determining one or more actions to be initiated and/or in identifying when an action is not to be taken. In some embodiments, the database comprises one or more tables that correlate conditions and/or parameters with actions. For example, some actions are instructed in response to a single condition existing, while other actions are instructed when a combination of two or more conditions existing. In some embodiments, the scan confirmation circuit obtains one or more historic levels of accuracy corresponding to an inventor, and based on the current level of accuracy and a set of previous levels of accuracy determined based on previous purchases made by the customer in association with the use by the customer of one of the product scanning systems. Directing that an action be taken may include directing the action while the customer continues to travel across the sales floor and prior to a final purchase as a function of the current level of accuracy and the historic level of accuracy.

In some instances, the level of accuracy may be an exact correlation or exact consistency, while in other instances the level of objective accuracy may be based on some threshold amount of variation. Further, the threshold variation may be based on one or more factors, such as but not limited to quantity of products in the RFID detected product listing, quantity of products in the purchase list, estimated value of products in the RFID detected product listing, estimated value of products in the purchase list, a shopping list, duration of time within the retail store, patterns of movement of the customer in the retail store, previously determined consistencies between purchase lists and RFID detected product listings from one or more prior visits by that customer to the retail store and/or one or more other retail stores (e.g., other stores of a chain of stores, other stores that have a security agreement, and/or other such stores), historic consistencies corresponding to a particular product scanning system, statistical historic consistencies (e.g., average, mean, median, etc.) at that retail store or set of retail stores, other such factors, or combination of such factors. For example, a threshold variation may allow for less variation when a customer has in the past demonstrated inconsistencies. As another example, a greater variation may be allowed for a customer that historically has made purchases of large quantities of products. Still another example may enable a larger variation based on types of products being retrieved (e.g., products that often are difficult to detect by RFID tag readers and/or products that are known to often have their RFID tags become detached). In some embodiments, the scan confirmation circuit is further configured to obtain a historic level of accuracy based on the current level of accuracy and a set of one or more previous levels of accuracy determined based on previous purchases made by the customer in association with the use by the customer of one of the product scanning systems 108. For example, the historic level of accuracy may be determined as an accumulative score based on past purchases and current shopping, an average of the current accuracy and one or more previously determined accuracies, and/or some other determined historic level of accuracy. The scan confirmation circuit and/or the central control circuit can be configured to compare the determined historic level of accuracy (e.g., accumulative score) relative to one or more thresholds and provide an objective rating of the customer. In some embodiments, the scan confirmation circuit is further configured to objectively define, corresponding to a particular customer shopping at the retail store, a customer accuracy level based on a determined current level of accuracy, determined while the customer is still in the store and without having the customer enter or pass a choke point, and a set of previous levels of accuracy determined based on previous purchases made by the customer in association with the use by the customer of one of the product scanning systems. Further, the customer can be notified of the defined customer accuracy level.

Additionally or alternatively, the determined accuracy and/or historic accuracy may be compared against other customers at the retail store and/or other retail stores that utilize the product scanning systems and assign the customer of interest a rating or ranking relative to these other customers. For example, in some instances each time a customer purchases products and achieves at least a threshold level of accuracy relative to the corresponding RFID detected product listing, an accumulative rating or ranking may increase. Further, in some instances, determined accurate scans of more expensive products may correspond to a greater rating (e.g., generate a greater jump in rating) than several scans of less expensive products. In some instances, different ratings may be provided for a customer (e.g., ratings based on product cost, rating based on high turn-over products, ratings based on products more susceptible to shoplifting, etc.). Accordingly, in some applications, different products may have different weightings on the determined rating of the customer. The determined accuracy, historic accuracy and/or customer rating may be used in determining one or more actions to be directed. In some embodiments, for example, the scan confirmation circuit may cause the customer to be notified that the level of accuracy, rating and/or historic accuracy is at a threshold level (e.g., a time saver threshold) and direct the customer to proceed to an automatic checkout.

As introduced above, one or more actions may be initiated in response to a determination by the scan confirmation circuit that a current accuracy is below a threshold level and/or there is a threshold difference between the RFID detected product listing and the purchase list. Typically, the scan confirmation circuit in directing an action to be taken directs a determined action to occur while the customer continues to travel across the sales floor and prior to a final purchase. Again, the accuracy may be determined as a function of the current level of accuracy and/or a historic level of accuracy. The actions may include directing a wireless communication to a customer's user device 120 and/or the product scanning system 108 that is associated with the customer notifying the customer of one or more inconsistencies; a worker may be directed to notify the customer; one or more computer vision systems may be activated and/or otherwise directed to capture images and/or video content that is processed in attempts to confirm the presence or absence of one or more products; a communication may be sent to the customer's user device and/or the product scanning system associated with the customer that the customer is authorized to exit the store without preforming a check-out through a point of sale system; a communication may be sent to the customer requesting authorization to complete a sale and charge the customer for the products scanned without further check-out; a product detected through multiple RFID tag readers may be automatically added to the purchase list; a notification can be communicated to the customer that a product detected through one or more RFID tag readers has been added to the purchase list, and may provide the customer with one or more options (e.g., requesting that the product not be added, requesting a worker to audit the products in the cart, etc.); notifying the customer of a level of a customer rating objectively determined based on current and/or historic scanning of products; notifying the customer that they are to proceed to a point of sale system prior to departing the store; other such action; or combination of two or more of such actions. As described above, one or more rules may dictate the one or more actions to be initiated based on the existing conditions. Similarly, customers may be provided one or more benefits when the historic accuracy rating of those customers have reached a threshold level, are maintained above a threshold level for a predefined number of shopping visits, and the like.

Figure 3:
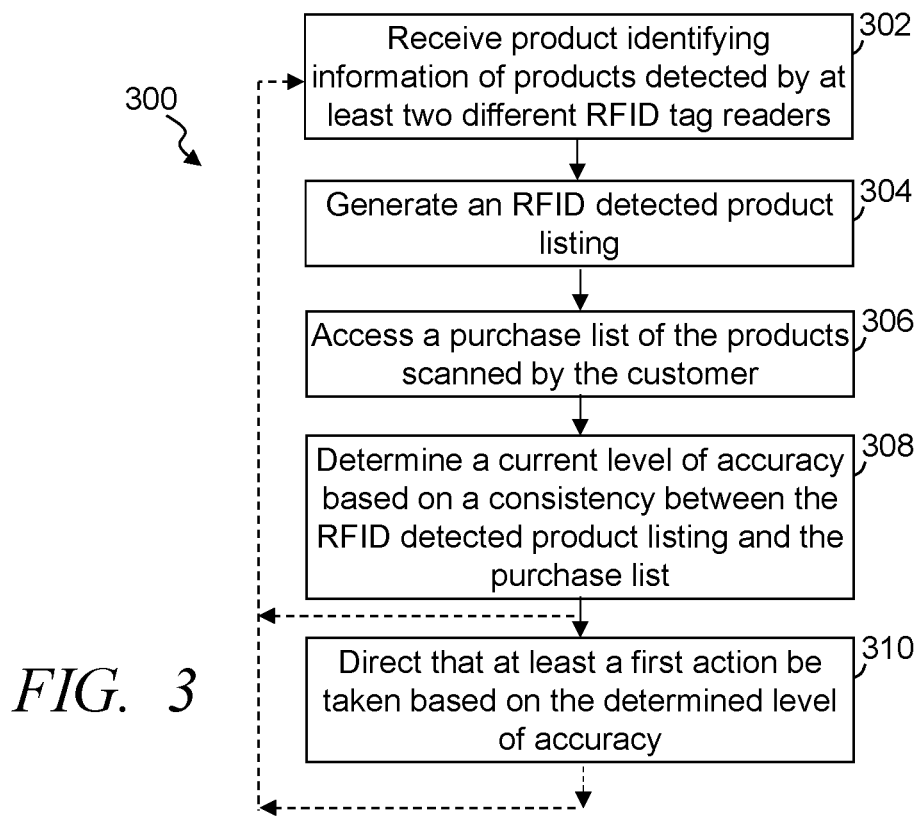
FIG. 3 illustrates a simplified flow diagram of an exemplary process of automatically confirming products scanned by customers using product scanning systems, in accordance with some embodiments.

FIG. 3 illustrates a simplified flow diagram of an exemplary process 300 of automatically confirming products scanned by customers using product scanning systems 108, in accordance with some embodiments. In step 302, product identifying information is received at a scan confirmation circuit 110 of products detected by at least two different RFID tag readers of the plurality of RFID tag readers arranged over and/or along the sales floor 200 of a retail store. In some implementations, the RFID tag readers are arranged in one or more patterns, grids or the like to provide read areas over a majority of the travel areas 204 of the sales floor, and in some instances over all of the sales floor. As described above, the RFID obtained product identifying information is associated with the customer as the customer travels along the sales floor without the customer having to travel through a choke point in the retail store. In some embodiments, the RFID tag readers 102 are arranged to read the product RFID tags 104 as the customer moves along the travel areas 204 of the retail store.

In step 304, an RFID detected product listing is generated of the products detected by the different RFID tag readers and associated with the customer. In step 306, a purchase list is accessed of the products scanned by the customer using a product scanning system 108 associated with the customer when the products were scanned. In some embodiments, the purchase list of products is created by a scan compiling circuit 106 operating independent of the plurality of RFID tag readers and communicatively coupled with one or more of the plurality of portable product scanning systems 108, which are each configured to enable a customer to scan identifying information of products that the customer intends to purchase as the customer travels through the sales floor of the retail store.

In step 308, a current level of accuracy is determined based on a consistency between the RFID detected product listing and the purchase list. In step 310, one or more actions can be directed to be taken based on the determined level of accuracy determination of whether the RFID detected product listing is consistent with the purchase list. The actions may include adjusting a customer's accuracy rating, notifying the customer of an adjustment in the customer's accuracy rating, notifying the customer of an inconsistency, notifying a worker to take one or more actions, communicating one or more instructions to the customer, and/or other such actions. Some embodiments repeatedly determine the current level of accuracy while the customer continues to travel through at the portion of the sales floor. Further, in some implementations, a historic level of accuracy based on the current level of accuracy and a set of previous levels of accuracy is determined based on previous purchases made by the customer in association with the use by the customer of one of the product scanning systems. An action to be taken can include directing one or more actions while the customer continues to travel across the sales floor and prior to a final purchase as a function of the current level of accuracy and the historic level of accuracy.

Typically, each product of the RFID detected product listing is confirmed based on being detected by at least two different RFID tag readers at two different locations of the sales floor and corresponding to the customer's location at the time of the detection by the two RFID tag readers. Some embodiments further confirm that the movement over the sales floor of each of the products of the RFID detected product listing corresponds to movement of the customer over the sales floor. Additionally or alternatively, some embodiments determine whether movement of the product RFID tags is consistent with locations of the product scanning system used by the customer. In some instances, for example, the movement over the sales floor of each of the products of the RFID detected product listing is confirmed to correspond to a movement of the product scanning system associated with the customer.

In directing an action, some embodiments identify when the current level of accuracy is at least a threshold level of accuracy, and cause a notification to be communicated to the customer authorizing the customer to exit the retail store without having to pass through a check-out area where products are subsequently scanned for purchase. Some embodiments identify, while the customer continues to travel over the sales floor, when a product that is identified in the RFID detected product listing is not included in the purchase list, and direct an action to be taken to cause a notification to be communicated to the customer, while the customer continues to travel over the sales floor, notifying the customer of the inconsistency and requesting the customer scan the product. This notification may be from the scan confirmation circuit, from a central control circuit 128, from a customer interface system, or the like. Further, the communication may be directed to the customer's personal user device 120, a product scanning system being utilized by the customer, an interface on a shopping cart, other such device, or combination of two or more of such devices. Further, the communication may be through an APP on the customer's user device, a text message, an email, a phone call, or other such method. In some embodiments, the action directed can comprise triggering one or more computer vision systems 122 to capture and evaluate images of the products being moved by the customer as the customer continues to move along the sales floor. Based on image processing, the system may confirm a discrepancy between the RFID detected product listing and the purchase list, confirm the presence of one or more products in a shopping cart, basket or the like, determine a product is not present in the cart, and/or other such determinations. In some embodiments, the system objectively defines, corresponding to the customer, a customer accuracy level based on the current level of accuracy and a set of previous levels of accuracy determined based on previous purchases made by the customer in association with the use by the customer of one of the product scanning systems. The customer may be notified of the defined customer accuracy level. Some embodiments may further inform the customer of one or more benefits available to the customer and associated with an accuracy level, changes in benefits available to the customer based on a change in accuracy level, whether increase or decrease in benefits, and/or other such information.

Figure 4:
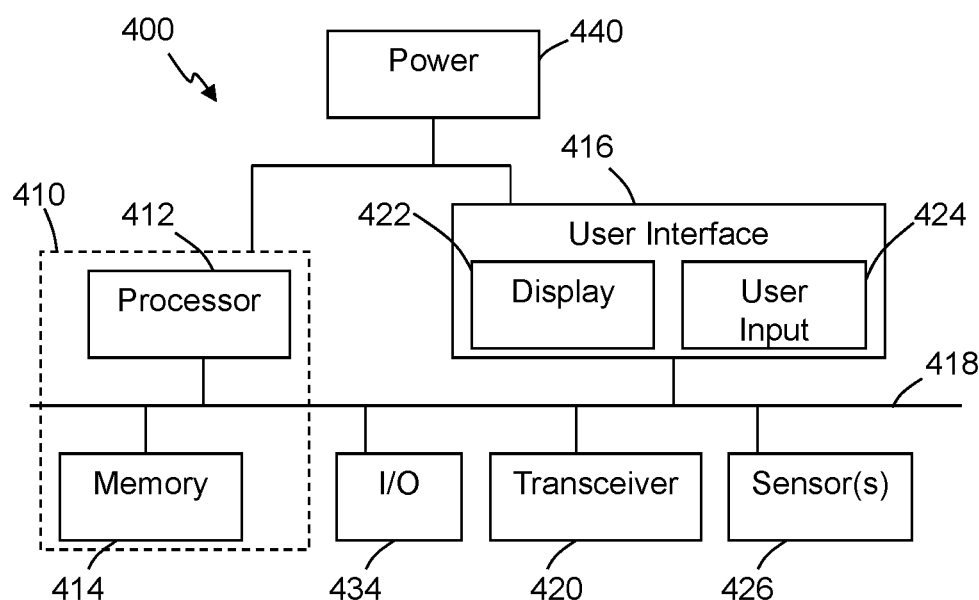
FIG. 4 illustrates an exemplary system for use in implementing methods, techniques, devices, apparatuses, systems, servers, sources and enabling the objective confirmation of customer scanning accuracy, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the components, circuits, circuitry, systems, functionality, apparatuses, processes, or devices of the product confirmation system 100, and/or other above or below mentioned systems or devices, or parts of such circuits, circuitry, functionality, systems, apparatuses, processes, or devices. For example, the system 400 may be used to implement some or all of scan confirmation circuit 110, the scan compiling circuit 106, the RFID tag readers 102, the product scanning systems 108, the user devices 120, the inventory system 116, the computer vision system 122, the central control circuit 128, and/or other such components, circuitry, functionality and/or devices. However, the use of the system 400 or any portion thereof is certainly not required.

By way of example, the system 400 may comprise a control circuit or processor module 412, tangible memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like. For example, the system may implement the scan confirmation circuit with the control circuit being a scan confirmation control circuit, the scan compiling circuit with a scan compiling control circuit, or other components.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network 112 (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the system 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the scan confirmation circuit, the scan compiling circuit, the RFID tag readers, the product scanning systems, the computer vision systems, the user devices, etc. The sensors can include substantially any relevant sensor, such as distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, cameras and image processing, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 112. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

In some embodiments, systems and methods are provided to confirm customer scanning at a retail store. Some embodiments provide retail store automated product confirmation system, comprising: a plurality of RFID tag readers arranged in a grid over a sales floor of a retail store; a scan compiling circuit operating independent of the plurality of RFID tag readers and communicatively coupled with a plurality of portable product scanning systems each configured to enable a customer to scan identifying information of products at a retail store that the customer intends to purchase as the customer travels along the sales floor of the retail store, wherein the scan compiling circuit is configured to associate the scanned identifying information with the customer and create a purchase list of the products scanned by the customer; and a scan confirmation circuit communicatively coupled with the plurality of RFID tag readers and the scan compiling circuit, wherein the scan confirmation circuit is configured to: receive product identifying information of products detected by at least two different RFID tag readers of the plurality of RFID tag readers, and wherein the received product identifying information and the corresponding products are to be associated with the customer as the customer travels along the sales floor without the customer having to travel through a choke point in the retail store, generate an RFID detected product listing of the products detected by the at least two different RFID tag readers and that are associated with the customer, determine a current level of accuracy based on the consistency between the RFID detected product listing and the purchase list, and direct that at least a first action be taken based on the determined level of accuracy determination of whether the RFID detected product listing is consistent with the purchase list.

Some embodiments provide methods of automatically confirming products scanned by customers, comprising: receiving at a scan confirmation circuit product identifying information of products detected by at least two different RFID tag readers of a plurality of RFID tag readers arranged in a grid over a sales floor of a retail store, wherein the product identifying information is to be associated with the customer as the customer travels along the sales floor without the customer having to travel through a choke point in the retail store; generating an RFID detected product listing of the products detected by the at least two different RFID tag readers and that are associated with the customer; accessing a purchase list of the products scanned by the customer, wherein the purchase list of products is created by a scan compiling circuit operating independent of the plurality of RFID tag readers and communicatively coupled with a plurality of portable product scanning systems each configured to enable a customer to scan identifying information of products at a retail store that the customer intends to purchase as the customer travels along the sales floor of the retail store; determining a current level of accuracy based on a consistency between the RFID detected product listing and the purchase list; and directing that at least a first action be taken based on the determined level of accuracy determination of whether the RFID detected product listing is consistent with the purchase list.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail store automated product confirmation system, comprising:
   a plurality of RFID tag readers arranged in a grid over a sales floor of a retail store;
   a plurality of portable product scanning systems each configured to enable a customer to scan identifying information of products at a retail store that the customer intends to purchase as the customer travels along the sales floor of the retail store;
   a scan compiling circuit operating independent of the plurality of RFID tag readers and communicatively coupled with the plurality of portable product scanning systems wherein the scan compiling circuit is configured to associate the scanned identifying information with the customer and create a purchase list of the products scanned by the customer; and
   a scan confirmation circuit communicatively coupled with the plurality of RFID tag readers and the scan compiling circuit, wherein the scan confirmation circuit is configured to:
      receive product identifying information of products detected by at least two different RFID tag readers of the plurality of RFID tag readers, and wherein the received product identifying information and the corresponding products are to be associated with the customer as the customer travels along the sales floor without the customer having to travel through a choke point in the retail store;
      generate an RFID detected product listing of the products detected by the at least two different RFID tag readers and that are associated with the customer;
      determine a current level of accuracy based on the consistency between the RFID detected product listing and the purchase list; and
      direct that at least a first action be taken based on the determined level of accuracy determination of whether the RFID detected product listing is consistent with the purchase list;
   wherein the scan confirmation circuit in determining the current level of accuracy repeatedly determines the current level of accuracy while the customer, using a respective one of the plurality of portable product scanning systems, continues to travel through at least a portion of the sales floor while scanning the identifying information of products that the customer intends to purchase; and
   wherein the scan confirmation circuit in determining the current level of accuracy is configured to initiate the determination of the current level of accuracy in response to a detection by a first RFID tag reader of the plurality of RFID tag readers of a product that had not previously been detected by the first RFID tag reader, but was previously detected at a different RFID tag reader of the plurality of RFID tag readers.

2. The system of claim 1, wherein the scan confirmation circuit is further configured to obtain a historic level of accuracy based on the current level of accuracy and a set of previous levels of accuracy determined based on previous purchases made by the customer in association with the use by the customer of one of the product scanning systems; and
   wherein the scan confirmation circuit in directing the at least the first action be taken is configured to direct the at least the first action while the customer continues to travel across the sales floor and prior to a final purchase as a function of the current level of accuracy and the historic level of accuracy.

3. The system of claim 2, wherein the scan confirmation circuit is further configured to confirm each product of the RFID detected product listing is detected by the two different RFID tag readers at two different locations of the sales floor and corresponding to the customer's location at the time of the detection by the two RFID tag readers.

4. The system of claim 3, wherein the scan confirmation circuit is further configured to confirm that the movement over the sales floor of each of the products of the RFID detected product listing corresponds to movement of the customer over the sales floor.

5. The system of claim 1, wherein the scan confirmation circuit is further configured to confirm that the movement over the sales floor of each of the products of the RFID detected product listing corresponds to a movement of the product scanning system associated with the customer.

6. The system of claim 1, wherein the scan confirmation circuit is configured to:
identify when the current level of accuracy is at least a threshold level of accuracy; and
in directing the first action be taken causes a notification to be communicated to the customer authorizing the customer to exit the retail store without having to pass through a check-out area where products are subsequently scanned for purchase.

7. The system of claim 1, wherein the scan confirmation circuit is configured to:
identify, while the customer continues to travel over the sales floor, when a first product that is identified in the RFID detected product listing is not included in the purchase list; and
in directing the first action be taken causes a notification to be communicated to the customer, while the customer continues to travel over the sales floor, notifying the customer of the inconsistency and requesting the customer scan the first product.

8. The system of claim 1, wherein the scan confirmation circuit in directing the first action be taken triggers a computer vision system to capture and evaluate images of the products being moved by the customer as the customer continues to move along the sales floor, and confirm a discrepancy between the RFID detected product listing and the purchase list.

9. The system of claim 1, wherein the scan confirmation circuit is further configured to objectively define, corresponding to the customer, a customer accuracy level based on the current level of accuracy and a set of previous levels of accuracy determined based on previous purchases made by the customer in association with the use by the customer of one of the product scanning systems; and
notify the customer of the defined customer accuracy level.

10. The system of claim 1, wherein the scan confirmation circuit in determining the current level of accuracy is configured to initiate the determination of the current level of accuracy based on a predefined period of time.

11. The system of claim 1, wherein the scan confirmation circuit in determining the current level of accuracy is configured to initiate the determination of the current level of accuracy based on a schedule.

12. The system of claim 1, wherein the scan confirmation circuit in determining the current level of accuracy is configured to initiate the determination of the current level of accuracy in response to each product scanned by the respective one of the plurality of portable product scanning systems.

13. A retail store automated product confirmation system, comprising:
a plurality of RFID tag readers arranged in a grid over a sales floor of a retail store;
a plurality of portable product scanning systems each configured to enable a customer to scan identifying information of products at a retail store that the customer intends to purchase as the customer travels along the sales floor of the retail store;
a scan compiling circuit operating independent of the plurality of RFID tag readers and communicatively coupled with the plurality of portable product scanning systems wherein the scan compiling circuit is configured to associate the scanned identifying information with the customer and create a purchase list of the products scanned by the customer; and
a scan confirmation circuit communicatively coupled with the plurality of RFID tag readers and the scan compiling circuit, wherein the scan confirmation circuit is configured to:
receive product identifying information of products detected by at least two different RFID tag readers of the plurality of RFID tag readers, and wherein the received product identifying information and the corresponding products are to be associated with the customer as the customer travels along the sales floor without the customer having to travel through a choke point in the retail store;
generate an RFID detected product listing of the products detected by the at least two different RFID tag readers and that are associated with the customer;
determine a current level of accuracy based on the consistency between the RFID detected product listing and the purchase list; and
direct that at least a first action be taken based on the determined level of accuracy determination of whether the RFID detected product listing is consistent with the purchase list;
wherein the scan confirmation circuit in determining the current level of accuracy repeatedly determines the current level of accuracy while the customer, using a respective one of the plurality of portable product scanning systems, continues to travel through at least a portion of the sales floor while scanning the identifying information of products that the customer intends to purchase; and
wherein the scan confirmation circuit in determining the level of accuracy limits products from being added to the RFID detected product listing to those products confirmed to have been detected by the at least two different RFID tag readers and at different times at the at least two different RFID tag readers separated by at least a threshold duration of time.

14. The system of claim 1, wherein a first product scanning system of the plurality of scanning systems comprises a customer personal portable user device owned by a first customer and comprising an application implemented on the customer personal portable user device.

15. The system of claim 14, wherein the first product scanning system is configured to wirelessly communicate each of the scanned identifying information of the products to the scan compiling circuit along with a product scanning system identifier.

16. The system of claim 14, wherein a first product scanning system is configured to wirelessly communicate each of the scanned identifying information of the products to the scan compiling circuit along with an identification of a first customer with which the product scanning system is currently associated.

17. The system of claim 1, wherein the scan confirmation circuit is configured to wirelessly receive, from a first product scanning system, each of the scanned identifying information of the products along with an identification of a first customer with which the product scanning system is currently and temporarily associated.

* * * * *